UNITED STATES PATENT OFFICE.

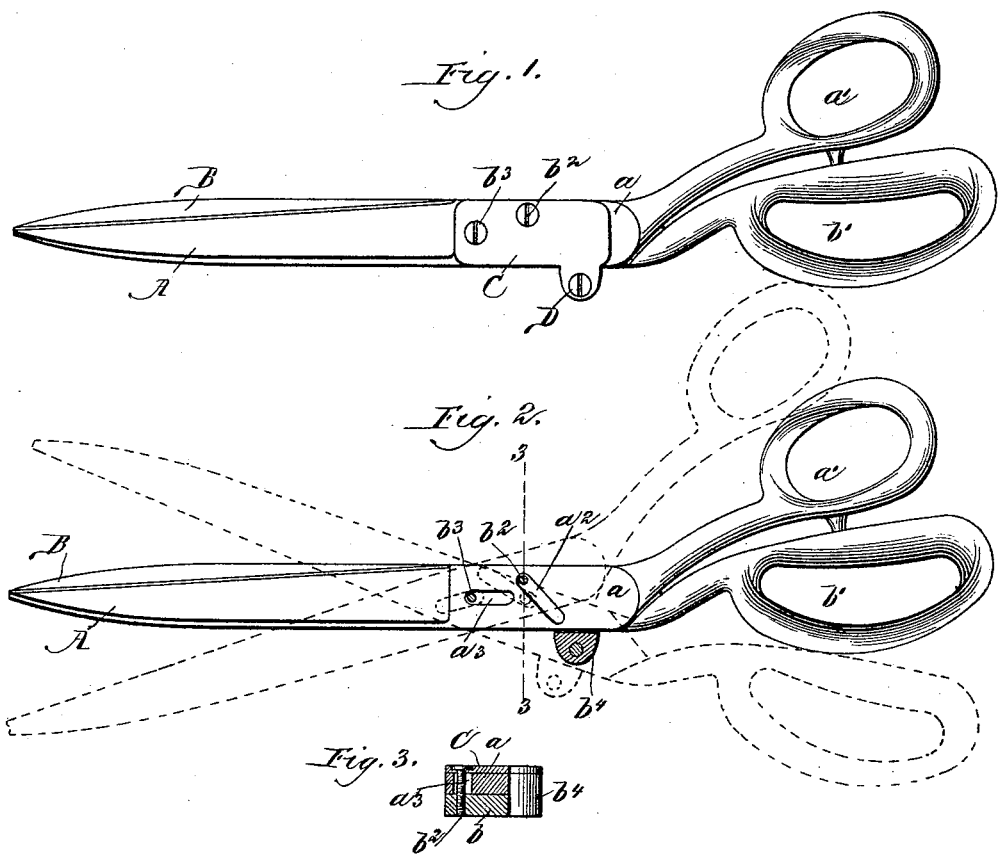

CHARLES W. HANSEN, OF CHICAGO, ILLINOIS.

SHEARS.

SPECIFICATION forming part of Letters Patent No. 460,704, dated October 6, 1891.

Application filed November 24, 1890. Serial No. 372,543. (No model.)

*To all whom it may concern:*

Be it known that I, CHARLES W. HANSEN, a citizen of the United States, residing at Chicago, in the county of Cook and State of Illinois, have invented a certain new and useful Improvement in Shears, of which the following is a specification.

My invention relates to a class of cutting implements known as "shears" and involving a couple of blades provided with handles and pivotally held together between their cutting and handle portions in a way to effect a draw or shear cut, it being understood that my invention is also applicable to scissors, which are in fact simply small shears.

The object of my invention is to provide a simple, compact, and convenient construction, and to avoid undesirably widening the shears along their middle or shank portion. Prior to my invention various constructions have been proposed for effecting a draw or shear cut in shears. Thus in Patent No. 31,849 the shank of one blade is provided with a longitudinal slot for a pivot on the shank of the other blade, and as a means for affording a second oblique slot for the second pivot one of the blades is provided with a laterally-projecting slotted arm. In my device I dispense with such arm and cover both slots by a plate substantially no wider than the width of an ordinary shear-blade along its middle or shank postion. The foregoing is also substantially applicable to the construction embodied in Patent No. 280,047.

In the accompanying drawings, Figure 1 represents a pair of shears embodying my invention and in a closed condition. Fig. 2 is a like view with the plate, which is employed to conceal the guideways in one of the blades and provide a bearing for the pivots employed, removed. This figure also illustrates in dotted lines the shears in an open condition. Fig. 3 is a section on line 3 3 in Fig. 2, the aforesaid plate being, however, present.

The shears herein illustrated involve as a matter of ordinary construction a couple of cutting-blades A and B, having their respective straight, middle, or shank portions $a$ and $b$ made substantially of ordinary width and extended back and respectively adapted to form handles $a'$ and $b'$, which can be taken hold of by the operator in the usual way. The blades are pivotally held together at their shank portions in such way that during operation one blade is forced to have an end movement in conjunction with its ordinary swinging action, and hence as a result of this compound movement a draw cut can be made. This enforced end movement of one blade relatively to the other blade is attained by a sliding pivotal connection between the two. As a simple, compact, and reliable way of providing between the two blades a pivotal connection of the character aforesaid, the blade A is provided with a couple of slots or guideways $a^2$ and $a^3$, which are formed in its straight shank portion, and the blade B is provided with pivots $b^2$ and $b^3$, which are arranged upon its shank portion $b$ and positioned to engage said guideways of the blade A. The guideway $a^2$ is arranged diagonal to the length of the blade, while the guideway $a^3$ is arranged parallel with or in the direction of said length of the blade. When the blades are closed, the pivots will be at the forward ends of the guideways—that is to say, at the ends of the guideways which in point of position are nearest to points of the blade—and when the blades are open to the allotted limit of their opening movement the pivots will be at the opposite ends of the guideways. The guideways may therefore be of a length to determine the extent to which the shears can be opened and at the same time enforce a relative end motion between the blades during the opening and closing action of the shears.

The act of opening and closing the blades will necessarily cause the pivots to shift their position along the slots, which, while permitting the blade to swing, will enforce a relative end movement between the blades. Thus, if blade B is held stationary, the act of opening blade A will also give it a forward end movement, and the act of closing it will give it a back end movement. On the other hand, if blade A is held stationary, the act of opening blade B will give it a back end movement, while the act of closing it will give it an end movement in a contrary direction.

I provide the blade B with a plate C, arranged to cover the slotted portion of blade A and adapted to provide a bearing for the pivots at one side of the shears. This plate could be made integral with the blade B, but is preferably made separate therefrom and held in place by a screw D, which engages in a small rounded lug $b^4$, arranged to project laterally, but to a short extent only, from one side edge of the shank portion of the blade B. This said lug also affords a seat for the plate, which can be removably held thereon by the screw. The pivots can be made integral with the plate C, or they can be made separate therefrom and formed to extend through the plate and slots and engage in the blade B.

What I claim as my invention is—

1. The combination, in a pair of shears adapted to effect a draw or shear cut, of the blade A, having its straight shank portion $a$ formed with an obliquely-arranged slot $a^2$ and a longitudinally-arranged slot $a^3$, the blade B, provided with pivots $b^2$ and $b^3$, arranged to extend through the slots in the shank portion of blade A, and the plate C, arranged and adapted to cover the slots and provide bearings at one side of the shears for the pivots, substantially as and for the purpose described.

2. The combination, in a pair of shears adapted to effect a draw or shear cut, of the blade A, having its shank portion formed with an obliquely-arranged slot $a^2$ and a longitudinally-arranged slot $a^3$, the blade B, provided with a laterally-arranged lug $b^4$ and with pivots $b^2$ and $b^3$, arranged to extend through the slots in the blade A, and a plate C, arranged to cover the slots and adapted to afford bearings for said pivots at one side of the shears, said plate being fitted upon and detachably secured to the lug $b^4$ by a screw D, substantially as described.

CHARLES W. HANSEN.

Witnesses:
 CHAS. G. PAGE,
 HARRY COBB KENNEDY.